Oct. 30, 1951     C. F. PETKWITZ     2,573,272
STORAGE DRAWER FOR REFRIGERATING APPARATUS
Filed July 21, 1947     3 Sheets-Sheet 1

INVENTOR.
CARL F. PETKWITZ.
BY Spencer, Hardman & Fale.
HIS ATTORNEYS.

Oct. 30, 1951 — C. F. PETKWITZ — 2,573,272
STORAGE DRAWER FOR REFRIGERATING APPARATUS
Filed July 21, 1947 — 3 Sheets-Sheet 2

INVENTOR.
CARL F. PETKWITZ.
BY Spencer, Hardman & Fehr.
HIS ATTORNEYS.

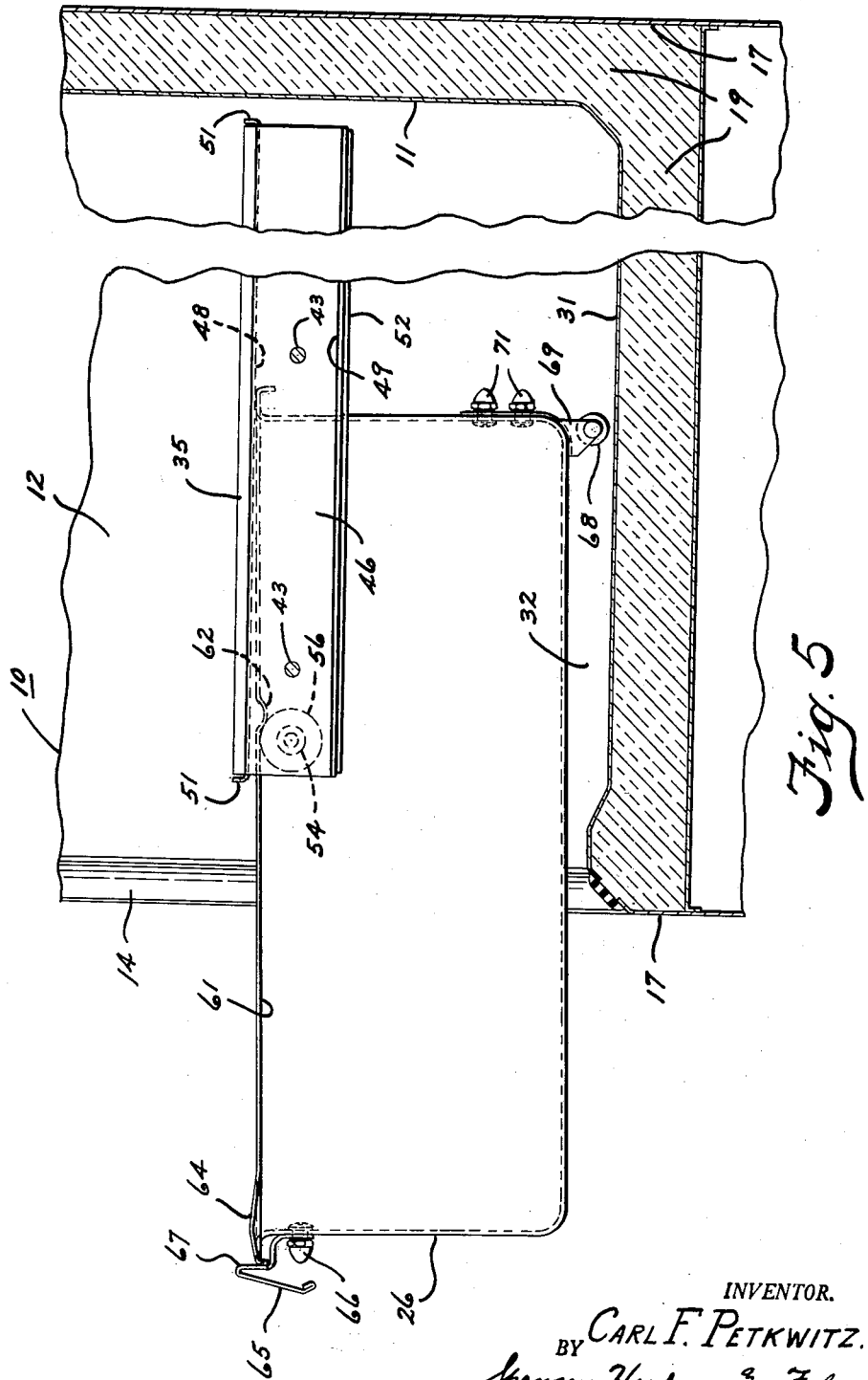

Patented Oct. 30, 1951

2,573,272

UNITED STATES PATENT OFFICE 2,573,272

STORAGE DRAWER FOR REFRIGERATING APPARATUS

Carl F. Petkwitz, Dayton, Ohio, assignor to General Motors Corporation, Dayton, Ohio, a corporation of Delaware Application July 21, 1947, Serial No. 762,236

2 Claims. (Cl. 312—342)

The present invention relates to refrigerating apparatus and particularly to an arrangement of mounting a hydrator receptacle within the food storage compartment of a refrigerator cabinet.

It has become common practice in the household refrigerator art to locate a receptacle and a cover therefor within the food storage compartment of a refrigerator cabinet so that the receptacle and its cover serves as a substantially closed container or hydrator wherein fresh vegetables are stored out of contact with the relatively dry air in the food compartment in order to maintain the vegetables crisp and fresh over long periods of time. Heretofore considerable difficulty has been experienced in mounting such a receptacle or hydrator within a food storage compartment so that it could be freely and easily moved relative to its cover into and out of the food compartment. My invention contemplates the mounting of a hydrator within a food compartment of a refrigerator cabinet in such a manner as to eliminate difficulties heretofore encountered in the manipulation thereof.

An object of my invention is to provide an improved mounting of a hydrator assembly in the food storage compartment of a refrigerator cabinet.

Another object of my invention is to provide for the mounting of a hydrator in the food compartment of a refrigerator cabinet so that the hydrator can be freely moved relative to its cover outwardly of and into the compartment through the access door opening thereof.

A further object of my invention is to rollably mount a hydrator in the food compartment of a refrigerator by supporting different portions of the hydrator from different portions of the food compartment.

A still further and more specific object of my invention is to provide a hydrator receptacle rollably mounted in a food compartment of a refrigerator with means for guiding the same to its open and closed positions, to provide the receptacle with a stop for limiting normal movement thereof outwardly through the food compartment access opening and to provide means whereby the hydrator receptacle will be supported or balanced in substantially a horizontal plane when moved partially outward of the food compartment.

Further objects and advantages of the present invention will be apparent from the following description, reference being had to accompanying drawings, wherein a preferred form of the present invention is clearly shown.

In the drawings:

Fig. 5 is a fragmentary broken vertical sectional view similar to Fig. 4 showing the hydrator receptacle moved outwardly relative to its cover through the access opening of the food storage compartment;

Figure 1:
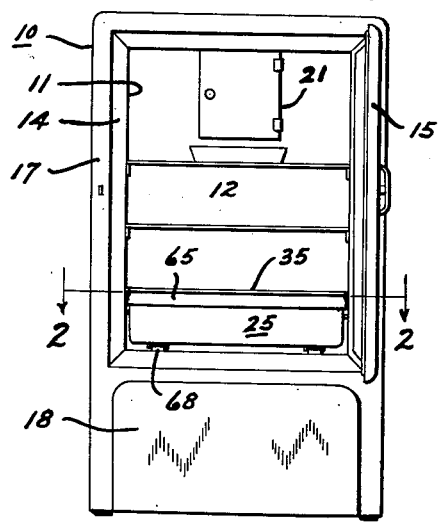
Fig. 1 is a front view of a refrigerator showing the door of the food storage compartment thereof in open position and having a hydrator assembly mounted in the compartment in accordance with my invention.

Referring to the various figures of the drawings for a detailed description of the present invention I have shown in Fig. 1 thereof a refrigerator cabinet 10 of usual construction and having an inner sheet metal shell or liner 11 (see Fig. 2) defining or forming walls of a food storage compartment 12 provided with an access opening 14 and a door 15 for closing the access opening. Cabinet 10 also includes an outer sheet metal shell 17 which extends downwardly beyond compartment 12 and forms walls of a lower machine compartment normally closed by the door 18. Any suitable or desirable non-metallic material 19 is disposed between the shells 11 and 17 to heat-insulate the food compartment 12. An evaporator 21 of a closed refrigerating system is mounted in the upper portion of compartment 12 for cooling and causing circulation of air in the compartment. Evaporator 21 is connected in the well-known manner with a refrigerant compressing, liquefying and circulating unit (not shown) usually mounted in the machine compartment of cabinet 10 which is closed by the door 18.

Figure 3:
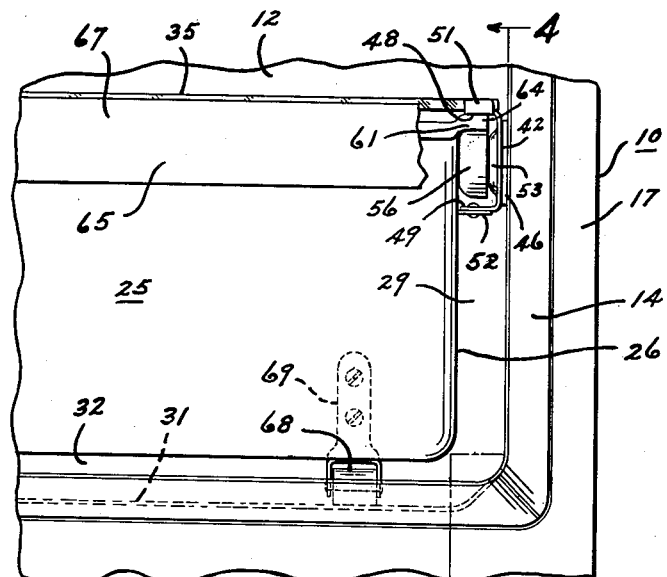
Fig. 3 is an enlarged fragmentary view of the refrigerator cabinet at the food compartment access door opening showing one side of the front of the hydrator assembly.
Figure 4:
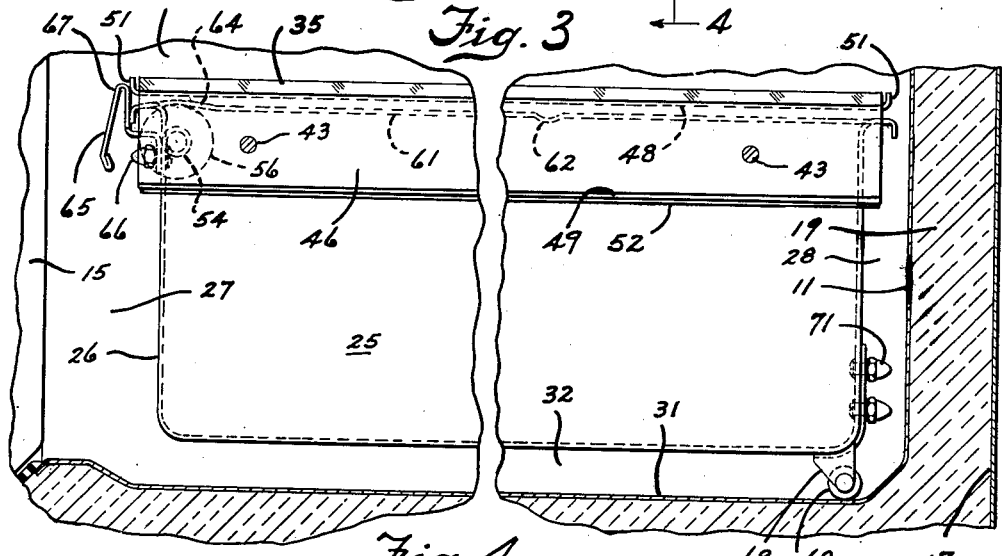
Fig. 4 is a fragmentary broken vertical sectional view taken on the line 4—4 of Fig. 3, showing the mounting of the hydrator in the food compartment of the refrigerator disclosed in Fig. 1.

A hydrator assembly, generally indicated by the reference character 25 in Figs. 1 and 4, is disposed in the lower portion of food storage compartment 12 of cabinet 10. A receptacle or pan member 26 has its vertical walls spaced from the vertical walls 11 of compartment 12 as at 27, 28 and 29 (see Figs. 3 and 4). The bottom wall of pan member 26 is spaced from the horizontal bottom wall 31 of compartment 12 is at 32. This spacing of receptacle or pan 26 provides for the circulation of air around all sides of the receptacle 26 so that its interior is maintained at a low temperature by conduction through walls of the assembly 25 to the circulating air. A cover 35, in the form of a partition, and preferably although not necessarily, formed of glass is spaced from the back wall of compartment 12 and also spaced from the door 15 to provide a closure for the pan member or receptacle 26 and which spacing permits the circulating air to flow down under the receptacle 26 at the front and rear thereof and around or along its sides. Thus the receptacle 26 and its cover 35 forms, what is commonly known as, a hydrator assembly within compartment 12 for the storage and preservation of vegetables and the like in a fresh condition out of direct contact with the relatively dry air of the food storage compartment.

In order to support the hydrator assembly within the food storage compartment 12 of cabinet 10, to provide for its free and easy movement into and out of the compartment 12, and also to limit the passage of any substantial quantities of air into and out of the hydrator I provide a unique mounting arrangement therefor. This arrangement, as will be presently described, includes the supporting of the pan or receptacle 26 at different points thereof and at different localities within compartment 12 so as to have divided points of support to eliminate relatively long frictionally engaging surfaces and to thus prevent sticking or binding of the pan 26.

Figure 2:
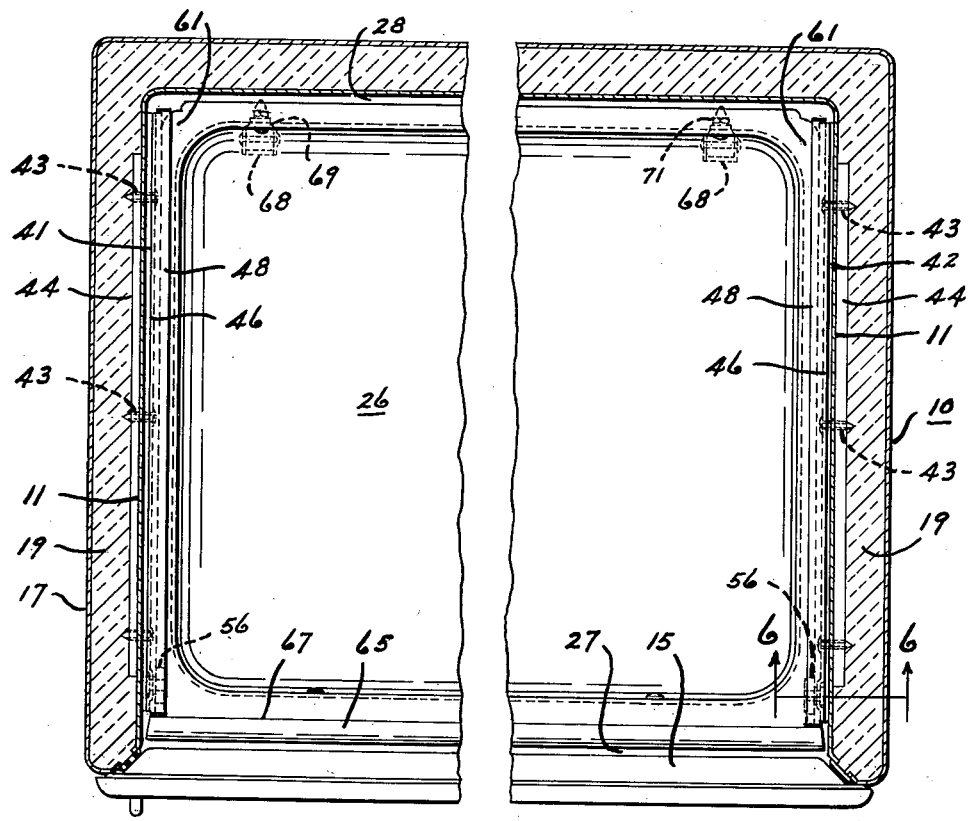
Fig. 2 is an enlarged horizontal broken sectional view taken on the line 2—2 of Fig. 1, showing a top plan view of the hydrator.
Figure 6:
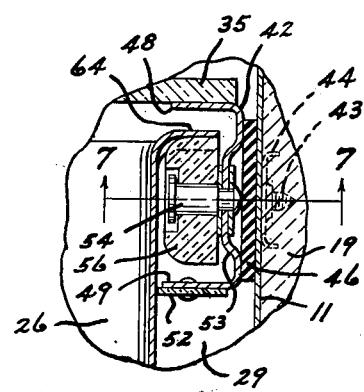
Fig. 6 is an enlarged fragmentary sectional view taken on the line 6—6 of Fig. 2 through one of the front roller supports for the hydrator receptacle.
Figure 7:
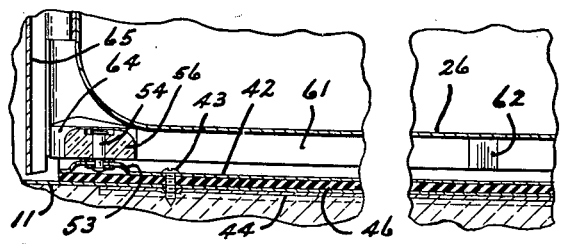
Fig. 7 is a broken fragmentary horizontal sectional view of the hydrator arrangement taken on the line 7—7 of Fig. 6.

A pair of metal channel members 41 and 42 are secured, one on each side of compartment 12, by screws 43 passing therethrough, through liner wall 11 and threaded into a reinforcing metal strip 44 located adjacent the wall 11 and imbedded in the insulation 19 (see Figs. 2, 6 and 7). A rubber or other resilient strip 46 is disposed under the channel members 41 and 42 to prevent these members from chipping a porcelain enamel finish provided on the liner 11 as the screws 43 are tightened. The horizontally extending legs of the channel members 41 and 42 provide a pair of horizontally spaced apart upper rails 48 and a pair of horizontally spaced apart lower rails 49 (see Fig. 6). Each upper rail 48 has an upturned ear 51 at both the front and rear ends thereof which ears hold the partition or glass cover 35 in position upon the rails 48 and prevents the cover from sliding outwardly of compartment 12 upon moving the receptacle 26 outwardly relative thereto. The horizontally spaced apart lower rails 49 each have a non-metallic strip 52 beneath the same and riveted thereto (see Figs. 3 and 6). Strips 52 are preferably formed of molded plastic compound or the like, and extend inwardly of the rails 49 a slight distance and terminate closely adjacent the vertical side walls of the receptacle 26 for a purpose to be hereinafter described. Each channel member 41 and 42 has a circular boss 53 (see Figs. 3 and 6) formed therein at a point adjacent the compartment access opening 14 and a stud 54 secured to the boss 53 in any suitable or desirable manner, forms a shaft upon which a roller 56 is rotatably mounted. Rollers 56 are thus fixedly mounted and are each preferably constructed of a hard non-metallic molded material.

Reverting now to the hydrator receptacle or pan member 26 it will be noted that edge portions at the top of its vertical side walls are flared outwardly to provide horizontal flanges 61 extending along the sides thereof. These flanges 61 extend into the channel area formed by channel members 41 and 42 in the same vertical plane with the upper and lower rails 48 and 49 respectively, and are adapted to roll upon the rollers 56 in spaced relation to the upper rail 48. The space between flanges 61 on hydrator 26 and the upper rails 48 on members 41 and 42 provides a limited amount of air circulation between the interior of the hydrator receptacle 26 and the food storage compartment 12. The flanges 61 along the sides of receptacle 26 are each provided with a depressed portion 62 located approximately two-thirds of the distance from the front to the rear of the receptacle and form stops for engaging the pair of horizontally spaced apart rollers 56, when the receptacle is moved outwardly of compartment access opening 14, to restrict or limit the normal outer movement of receptacle 26 as is best shown in Fig. 5 of the drawings. Adjacent the front of receptacle 26 both side flanges 61 are provided with an inclined raised portion 64, each of which is adapted to receive a roller 56, when the receptacle 26 is positioned beneath the cover 35, to indicate that the receptacle is in its closed position and to maintain the same in such position. A handle 65 is secured, by suitable bolts 66, to the front of receptacle 26 to facilitate manipulation thereof. This handle 65 has an upwardly extending and reversely bent portion 67 which is adapted to engage the upturned ears 51 at the front of rails 48 on members 41 and 42 so as to form a stop for the rearward movement of receptacle 26 into the compartment 12 (see Fig. 4). A pair of horizontally spaced apart rollers 68, secured to suitable brackets 69 and mounted by bolts 71 to the lower rear end of receptacle 26, forms roller means, as distinguished from the rollers 56, for supporting the rear portion of the hydrator receptacle from bottom wall 31 of the compartment 12. It will be noted that by supporting the hydrator receptacle 26 upon the flanges 61 at the front end thereof and by the roller means 68 at the rear end thereof the hydrator is maintained supported at spaced points in order to distribute its weight.

To move the hydrator receptacle 26 outwardly away from its cover 35, through the access opening 14 of food storage compartment 12, one merely grasps the handle 65 and applies a sort of wheelbarrow movement or motion to the hydrator which causes flanges 61 thereon to roll upon the rollers 56 and causes the roller means 68 at the rear of the receptacle to roll along the surface of the food compartment bottom wall 31. The movement of receptacle 26 is guided by the edges of non-metallic strips 52 which lightly engage the side walls thereof. Strips 52 thus prevent lateral movement of the hydrator receptacle and twisting or binding thereof is eliminated even though the receptacle is relatively wide, to thus cause the same to roll freely on the rollers 56 and roller means 68. The hydrator 26 may be moved from the position shown in Figs. 1, 2, 3 and 4 outwardly through the access opening 14 of compartment 12, when door 15 is opened, to the position shown in Fig. 5 of the drawings. As the stop portion 62 on flanges 61 approach the fixed or stationary rollers 56 the front end of hydrator receptacle 26 will tilt downwardly and the rear portion of flanges 61 will tilt upwardly and engage the underside of upper rails 48 on the members 41 and 42. The hydrator receptacle 26 is supported entirely from the rollers 56 and members 41 and 42 while the hydrator is in its forward position, because the roller means 68 are elevated relative to compartment bottom wall 31 when the receptacle tilts as described. Rollers 56 and members 41 and 42 maintain the receptacle 26 in a substantially horizontal plane in its forward position. While the stop means 62 on hydrator flanges 61, by engaging the rollers 56, limits normal forward movement of the hydrator, the hydrator receptacle 26 may be removed from the cabinet 10 for cleaning or other purposes, if desired. To remove the hydrator receptacle 26 from the cabinet 10 the front end thereof is elevated while in its normal full forward position, to cause the stop portions 62 to pass between the rollers 56 and the under-surface of upper rails 48 whereby the receptacle can be further moved outwardly of compartment 12 and away from cabinet 10.

From the foregoing it will be apparent that I have provided an improved hydrator assembly and an improved mounting thereof in a food storage compartment of a refrigerator cabinet. The mounting of the hydrator is such that, in spite of warpage, etc., during the process of baking a porcelain enamel finish thereon, it can be freely rolled to its closed or normal open position. By supporting the hydrator from rollers at different localities thereof within the food compartment and by providing a guide against which the side walls of the hydrator abut any tendency of the hydrator receptacle 26 to bind is prevented. While I have provided means for stopping the hydrator at its normal forward or open position to prevent accidental withdrawal thereof from the food compartment I have also provided means whereby the hydrator receptacle can be removed from the cabinet if desired.

While the form of embodiment of the invention as herein disclosed, constitutes a preferred form, it is to be understood that other forms might be adopted, as may come within the scope of the claims which follow.

What is claimed is as follows:

1. A refrigerator cabinet including a food storage compartment, said food storage compartment having an access opening in its front wall, a channel shaped in cross-section member secured to and extending along each side wall of said compartment in spaced relation to the compartment bottom wall, said channel members providing upper and lower horizontally spaced rails, a partition supported upon said upper rails, an open-topped receptacle positioned below said partition and cooperating therewith whereby the partition forms a cover for the open top of said receptacle, said receptacle having a flange extending outwardly from the upper portion of each side wall thereof into the channels formed by said members, means for supporting said receptacle in said position and for permitting the same to be moved outwardly away from said cover through the food compartment access opening comprising in combination, a roller within each channel formed by said members and mounted adjacent the food compartment access opening, said flanges on said receptacle being rollable upon said rollers and having a stop portion formed thereon for engaging said rollers and limiting the outward movement of said receptacle from said compartment, roller means secured to the rear portion of said receptacle and engaging said compartment bottom wall to cooperate with said rollers for supporting the receptacle in its said closed position within said compartment, said roller means being rollable along the bottom wall of said compartment when said receptacle is moved to an open position outwardly of its cover through said compartment access opening, said lower rails having non-metallic guide means associated therewith and lying along and adapted to be engaged by the upright side walls of said receptacle for preventing lateral movement thereof, and the rear portion of said flanges on said receptacle being engageable with said upper rails on said channel members upon engagement of said stop portion with said rollers for maintaining the receptacle in substantially a horizontal plane while it is extended outwardly of said compartment.

2. A refrigerator cabinet including a food storage compartment, said food storage compartment having an access opening in its front wall, a member secured to and extending along each side wall of said compartment in spaced relation to the compartment bottom wall, said members being shaped to provide horizontally spaced rails directed inwardly from opposed side walls of said compartment, a partition supported upon said rails, an open-topped receptacle positioned below said partition and cooperating therewith whereby the partition forms a cover for the open top of said receptacle, said receptacle having a flange extending outwardly from the upper portion of each side wall thereof beneath said rails, means for supporting said receptacle in said position and for permitting the same to be moved outwardly away from said cover through the food compartment access opening comprising in combination, a roller below each of said rails and mounted adjacent the food compartment access opening, said flanges on said receptacle being disposed between said rails and said rollers and rollable on the rollers during outward movement of said receptacle from said compartment, roller means at the rear portion of said receptacle and secured thereto, said roller means engaging said compartment bottom wall to cooperate with said rollers for supporting the receptacle in its closed position within said compartment partly from said compartment side walls and partly from said compartment bottom wall, said roller means being rollable along the bottom wall of said compartment while said receptacle is being moved outwardly of its cover through said compartment access opening, and said receptacle being tiltable about said rollers after extending the same a predetermined distance outwardly of said compartment to cause the rear portion of said flanges thereon to engage said rails on said members and hold the receptacle in substantially a horizontal plane.

CARL F. PETKWITZ.

REFERENCES CITED

The following references are of record in the file of this patent:

UNITED STATES PATENTS

| Number | Name | Date |
|---|---|---|
| 1,788,328 | Roberts | Jan. 6, 1931 |
| 1,888,041 | Long | Nov. 15, 1932 |
| 2,241,053 | Brightman | May 6, 1941 |
| 2,285,137 | Ahrens | June 2, 1942 |
| 2,328,835 | Motter | Sept. 7, 1943 |
| 2,338,889 | Yoxsimer | Jan. 11, 1944 |